Sept. 21, 1937.    H. WHITE ET AL    2,093,746
DISPLAY APPARATUS
Filed Nov. 10, 1934    5 Sheets-Sheet 1
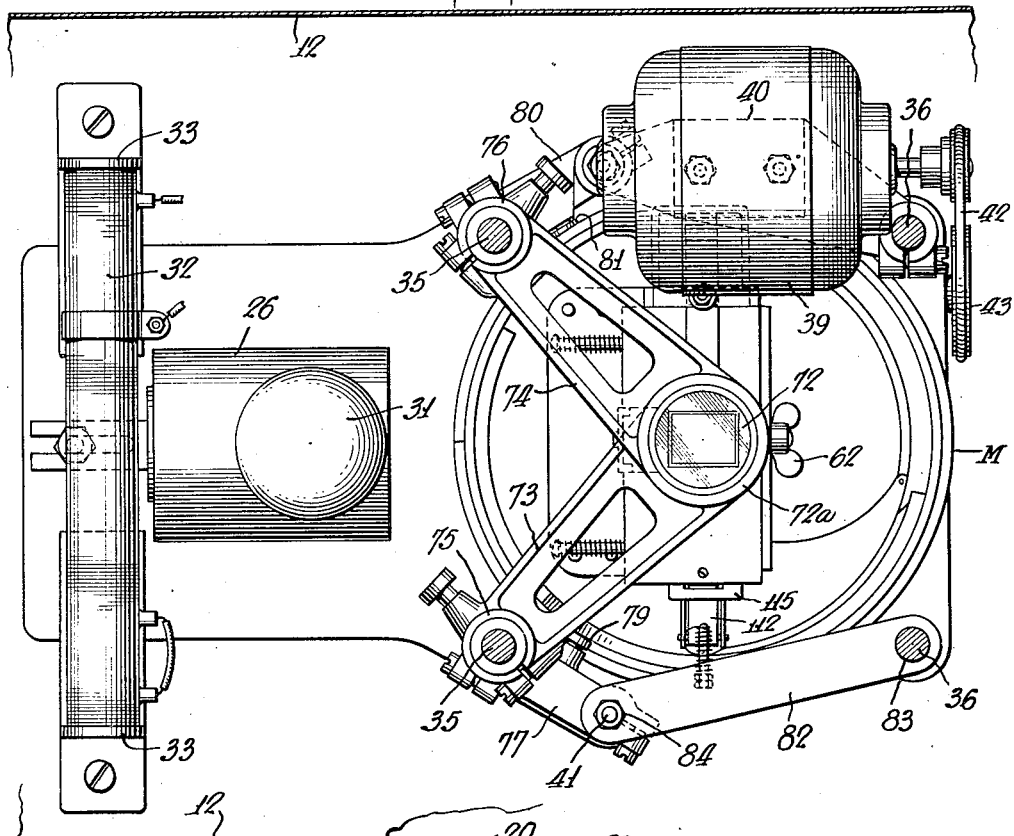
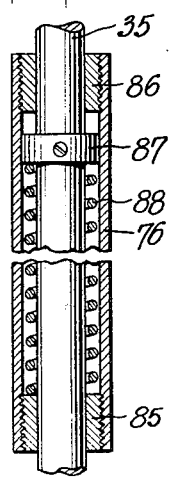
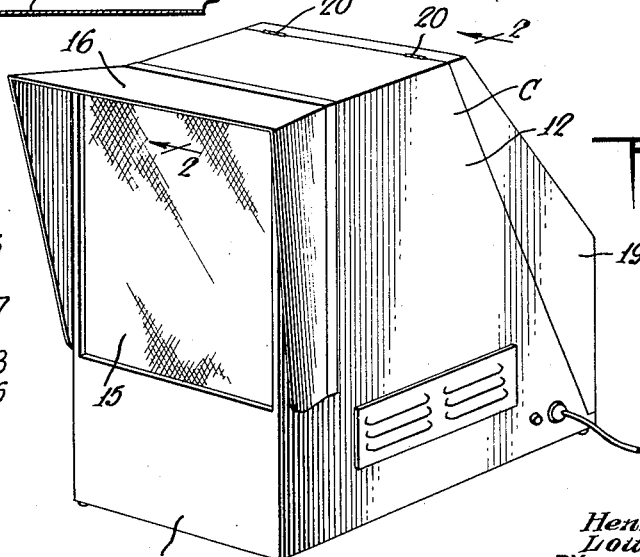
INVENTOR
Henry White
Louis W. G. Flynt
BY
Dean, Fairbank, Hirsch & Foster
ATTORNEYS

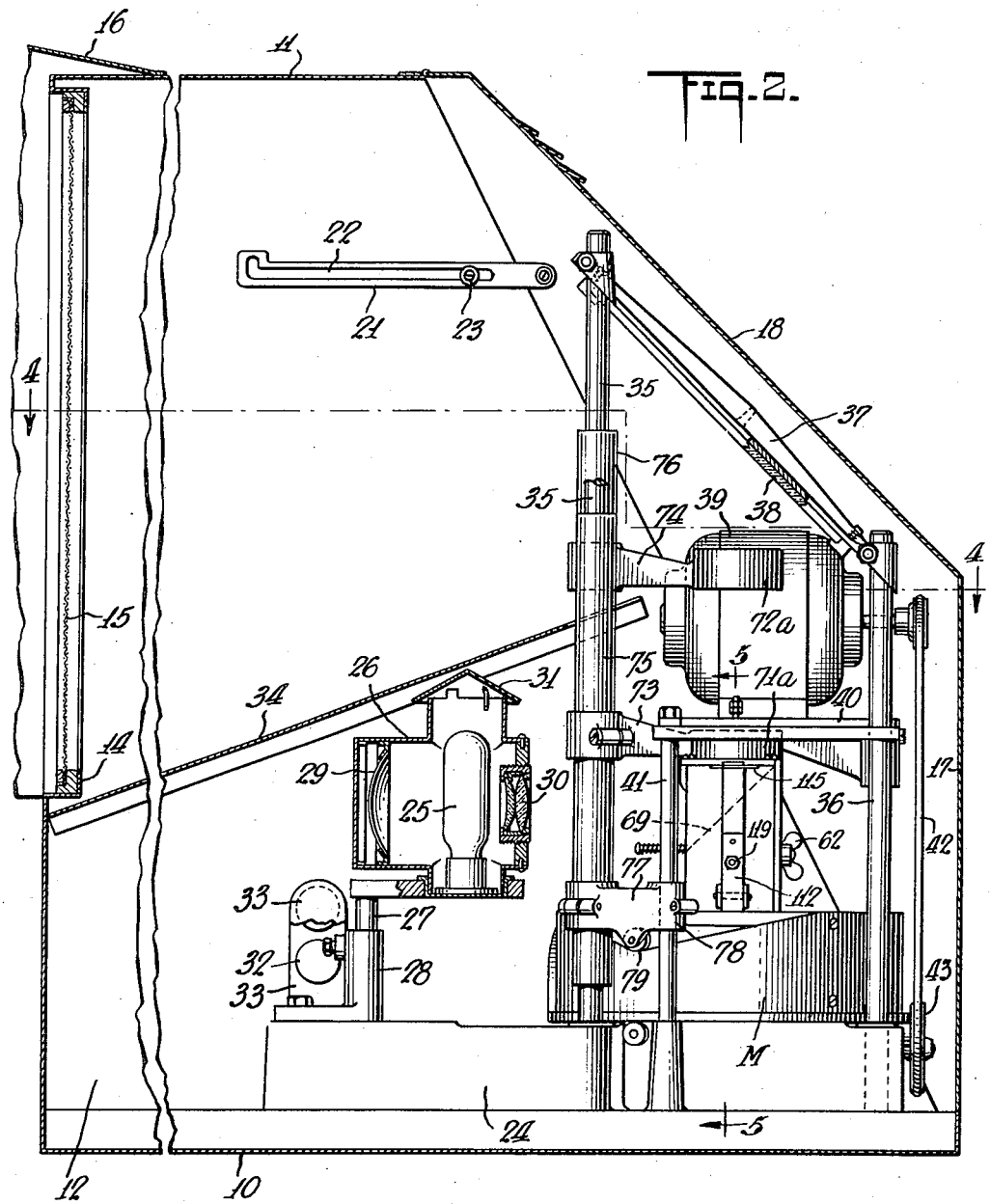

Sept. 21, 1937. H. WHITE ET AL 2,093,746
DISPLAY APPARATUS
Filed Nov. 10, 1934 5 Sheets-Sheet 3
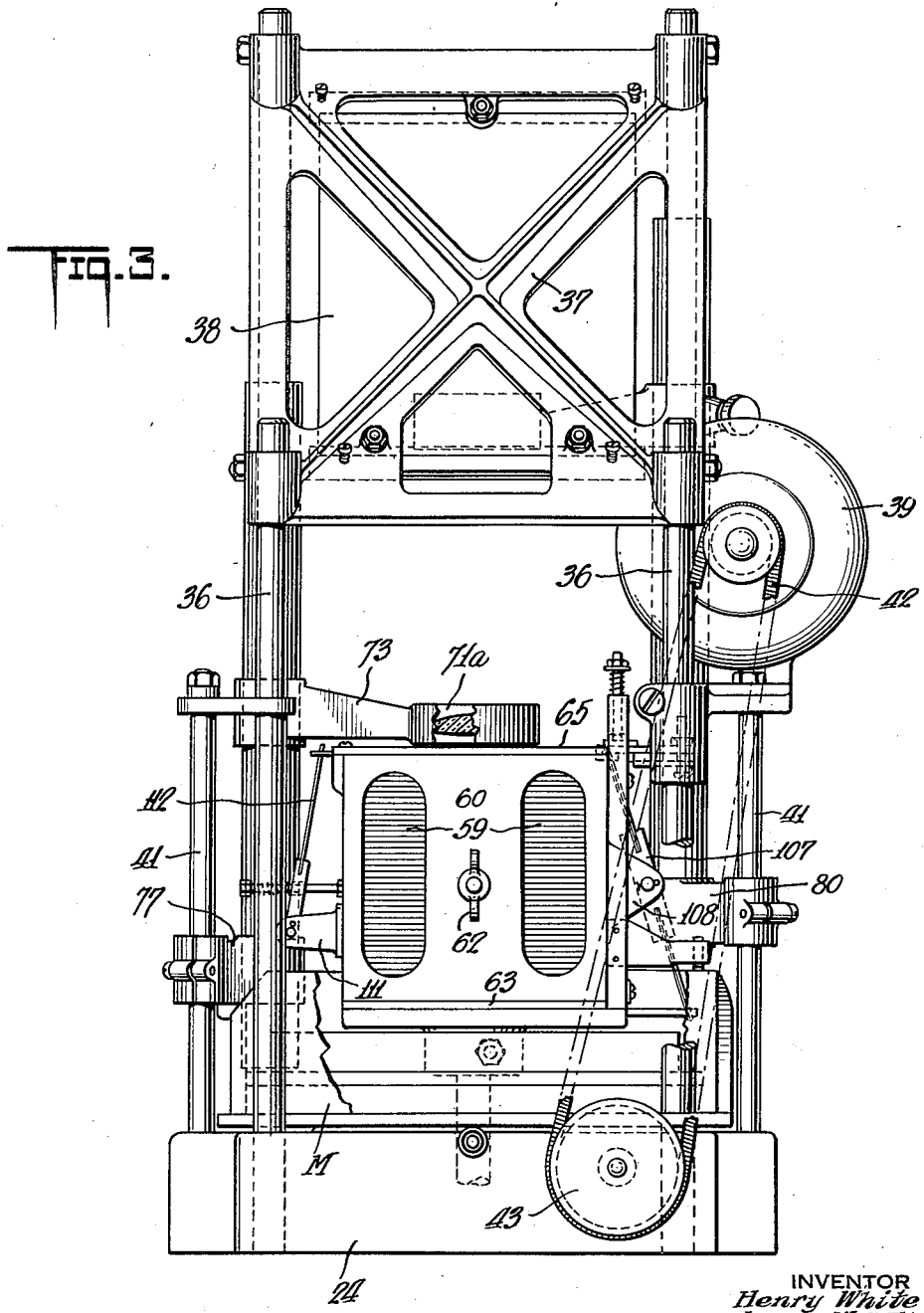
INVENTOR
Henry White
Louis W.G. Flynt
BY
Dean, Fairbank, Hirsch & Foster
ATTORNEYS Sept. 21, 1937.      H. WHITE ET AL      2,093,746
DISPLAY APPARATUS
Filed Nov. 10, 1934      5 Sheets-Sheet 4
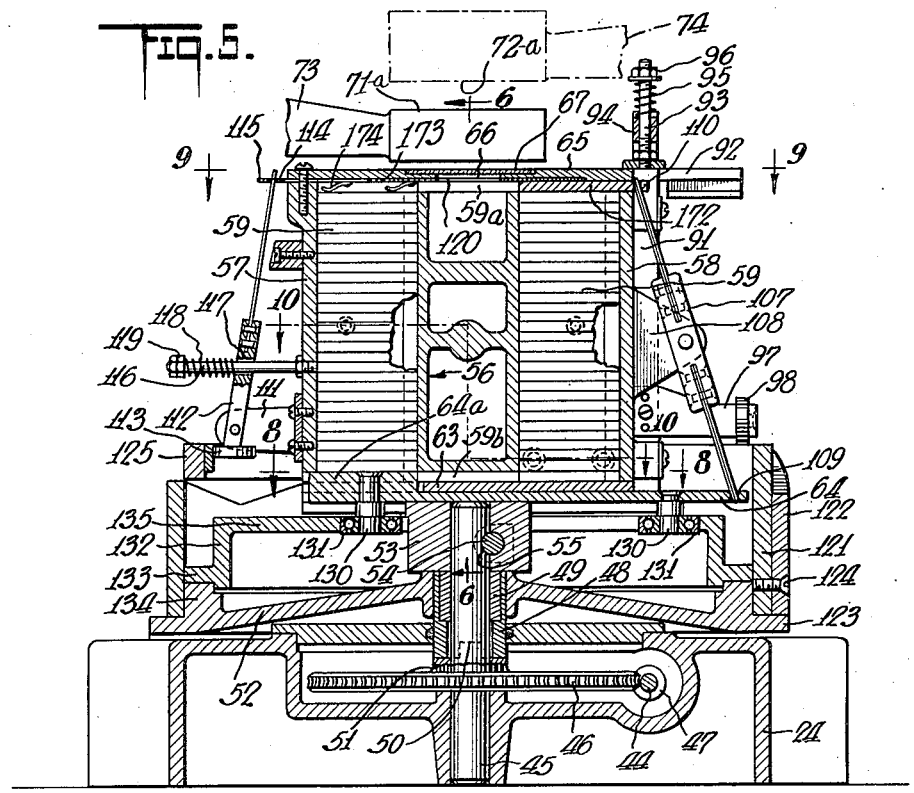
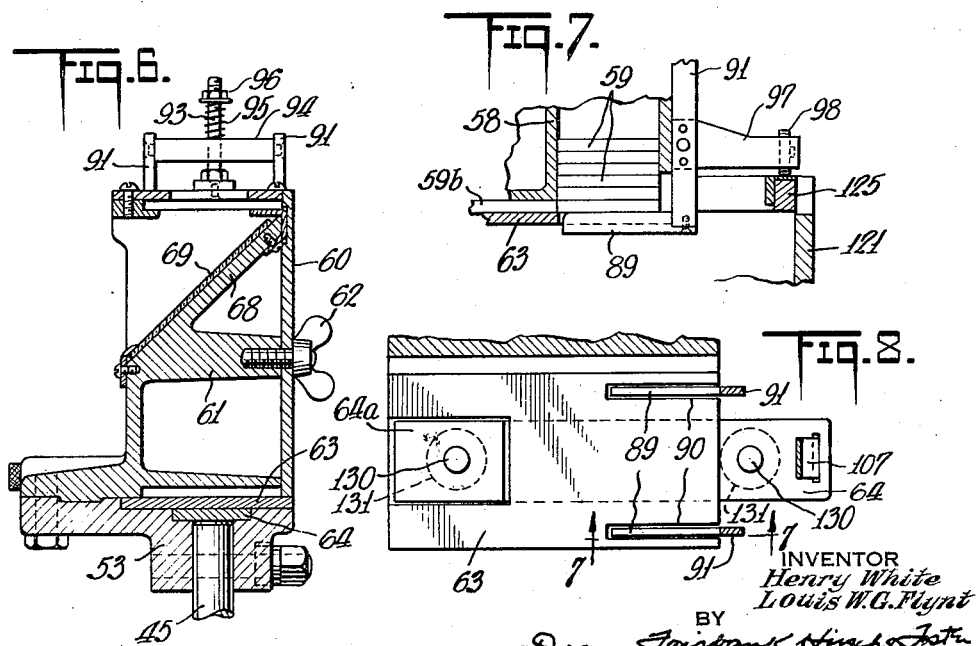

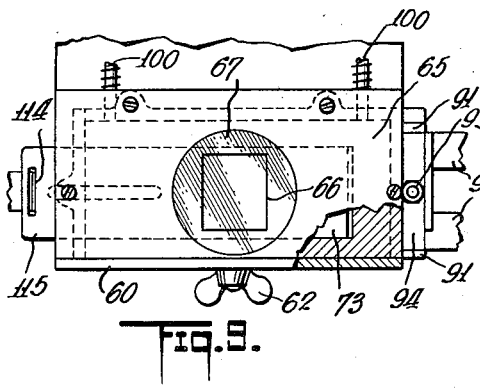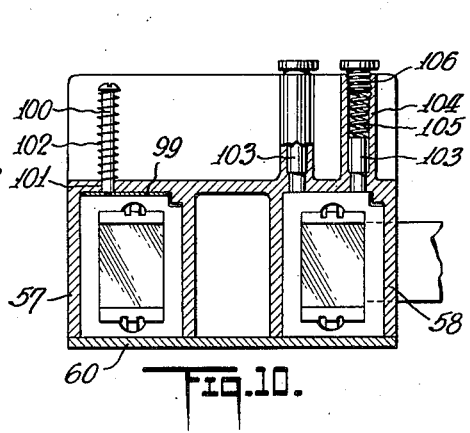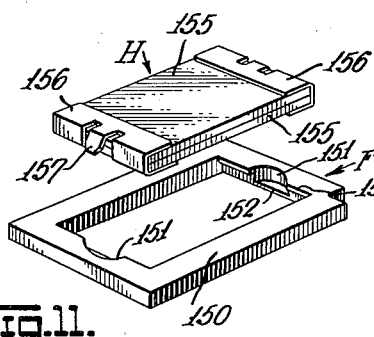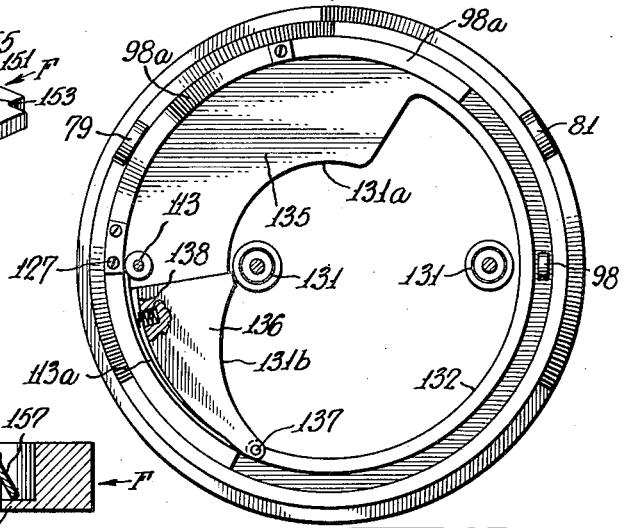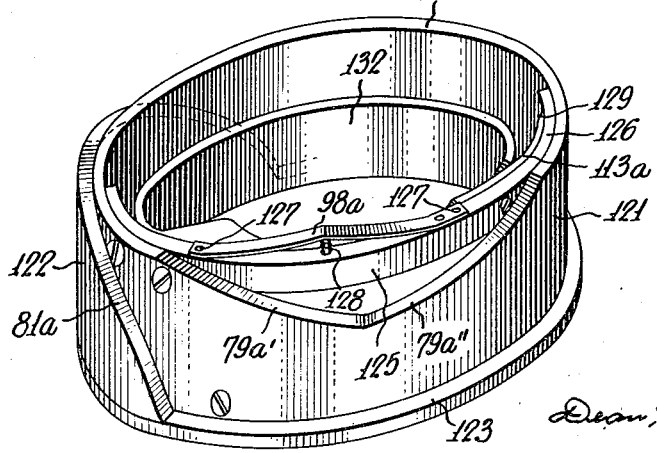

Patented Sept. 21, 1937

2,093,746

UNITED STATES PATENT OFFICE 2,093,746

DISPLAY APPARATUS

Henry White, New York, N. Y., and Louis W. G. Flynt, East Orange, N. J., assignors, by mesne assignments, to Lester Hofheimer, New York, N. Y.

Application November 10, 1934, Serial No. 752,452

9 Claims. (Cl. 88—28)

Our present invention while capable of a wide range of usefulness is primarily concerned with improvements in the general type of display apparatus disclosed in the copending application of Henry White Serial No. 677,842, filed June 27, 1933, and which has become Patent No. 2,042,815 of June 2, 1936.

The display apparatus is particularly intended for advertising purposes and is of the type in which a series of images are successively automatically projected upon a screen.

The present invention has certain objects in common with the invention disclosed in the prior application above identified, notably the provision of a device in which the size of the image on the screen may be varied while continuously maintaining the image in proper focus, thereby to obtain an illusion of motion tending to draw attention to the sign, the provision of a sign in which the images of a plurality of advertising or display devices are successively projected on the screen and caused to vary in size, the provision of an optical system for effecting the magnification or diminution of the image without variation of the distance between the object and the screen; the accomplishment of the foregoing results by reciprocally compensating lenses moving within a narrow range; the provision of such an apparatus in which the screen itself forms part of a relatively compact box or casing housing and concealing all of the mechanism.

More specific objects of the present invention are to greatly simplify the construction of the lens operating mechanism and the object shifting mechanism, to decrease the cost of manufacture, to render the construction simpler, more practical, more rugged and fool-proof, to reduce the number of parts required and to decrease the space required for accommodating the lens system, the slides or other objects, and the operating mechanism for the lens system, and the objects, yet at the same time permitting a great many more object members or slides to be accommodated in the machine.

Another object of the invention is to provide an automatic mechanism which, in addition to varying the size of the image on the screen, permits the image to dwell for a period of time without magnification or diminution. Preferably the image appears on the screen at minimum magnification, its size is increased to maximum magnification and the the dwell occurs when the magnification is at its maximum.

Another object of the invention is to conceal from the observer the change of objects to be projected, by the use of an intermittently acting shutter mechanism which blacks out one slide preferably while the latter is at maximum magnification and which exposes the next slide preferably when the latter is at minimum magnification.

Another object is to simplify the construction of all of the operating parts by the provision of a master cam which controls the lens movement, the movement of the slides and the movement of the shutter.

Another object is to provide a slide magazine and feeding arrangement which not only accommodates a large number of slides in a relatively small space but which may be very conveniently unloaded and recharged with new sets of slides as required.

Another object of the invention is to provide a fully automatic motor driven mechanism of this character which consumes but a small amount of electrical energy in operation.

Another object is to provide a simple, rugged individual slide holder to permit the ready interchange of slides and which fully protects a slide mounted therein despite casual or careless handling of the holder.

The invention may be more fully understood from the following description in connection with the accompanying drawings, wherein:—

Fig. 1 is a perspective view of the enclosing casing and projection screen of one of our improved display units, Fig. 2 is an enlarged vertical sectional view on the line 2—2 of Fig. 1, Fig. 3 is a rear elevational view of the mechanism contained within the casing, the casing itself being omitted, Fig. 4 is a sectional plan view on the line 4—4 of Fig. 2 with the screen plate for the light source omitted, Fig. 5 is a vertical sectional view through the slide mechanism and associated parts, taken approximately on the line 5—5 of Fig. 2, Fig. 6 is a vertical sectional detail through the mechanism, taken on the line 6—6 of Fig. 5, Fig. 7 is an enlarged vertical sectional detail on the line 7—7 of Fig. 8 illustrating the manner in which the lifting fingers engage one stack of slides.

Fig. 8 is a sectional plan view of the bottom of the slide magazine taken on the line 8—8 of Fig. 5, Fig. 9 is a top plan view of the slide magazine with parts broken away, this view being taken on the line 9—9 of Fig. 5, Fig. 10 is a sectional plan view of the mechanism taken on the staggered line 10—10 of Fig. 5, Fig. 11 is an enlarged perspective view of one of the slides and its associated carrier frame showing these members in disassociated relationship, Fig. 11a is a further enlarged broken longitudinal sectional view through the assembled slide and carrier frame, Fig. 12 is a perspective view of the master cam, Fig. 13 is a plan view of the master cam, and Fig. 14 is a detail through one of the columns showing the springs for holding the rollers of the lens carrying mechanism in contact with the cam.

The casing

A suitable type of cabinet C for housing and concealing all of the mechanism involved is illustrated in perspective in Fig. 1 and in vertical section in Fig. 2. This cabinet includes a fixed bottom 10 and a fixed top section 11 connected by rigid side wall forming sections 12. The upper portion of the front wall 13 of the cabinet defines a framing aperture 14 in which is accommodated a projection screen 15 of any suitable material. Preferably a hood member 16 is associated with the screen to shield the latter to some extent from external light and thus render more vivid the image which is projected on the screen from the light source within the cabinet or casing.

The rear wall 17 of the casing, the downwardly inclining rear portion 18 of the top wall of the casing and side wall extensions 19 are integrally connected together and constitute a hingedly movable unitary section which may be swung upwardly about the hinges 20, thereby fully exposing all of the mechanism from the rear of the cabinet. Any suitable means may be utilized for retaining this swingable section in open position as for instance conventional bayonet-slotted straps 21 pivoted on the swingable casing section, the bayonet slots 22 coacting with the fixed studs 23 on side walls 12 (Fig. 2).

General structure

Referring more particularly to the mechanism which is housed within the cabinet, this mechanism is supported upon a hollow base plate or casting 24. A suitable light source such for instance as the lamp 25 housed within a lamp casing 26 is supported above the base casting on a rod 27 adjustable within the sleeve 28 fixed with respect to the base casting. The light source and its housing may be entirely conventional, the lamp being backed by reflector 29, the light from the source being projected toward the rear of the casing through a system of filtering lenses 30 and the lamp being completely screened by the casing which may include a conventional cover 31 designed to afford suitable venting. Resistances 32 for the lamp may be advantageously mounted in the bracket 33 of which the post 28 forms a part.

As a further safeguard against any direct rays from the light source reaching the screen 15, an inclined opaque partition member 34 is preferably interposed between the light source and the screen.

Rising from the base 24 are a pair of spaced relatively tall front standards 35 and directly rearwardly of these standards and also rising from the base are a pair of shorter standards 36.

A pair of still shorter standards 41 rise from the base laterally and forwardly of standards 36. Adjustably connected in any suitable fashion to the upper ends of standards 35, 36 is an inclined mirror bracket 37 mounting a mirror 38, the images projected on such mirror being reflected directly upon the screen 15.

All of the operating mechanism is actuated or controlled through the intermediacy of a master cam indicated generally at M, and illustrated in perspective in Fig. 12 and in top plan in Fig. 13. A driving motor 39 supported upon a bracket 40 carried by one of the rear standards 36 and one of the standards 41, drives a belt 42, the latter in turn driving a pulley 43 on a horizontal shaft 44 journaled in the base casting 24. As best seen in Fig. 5, the base casting mounts a relatively massive rigid vertical stud member 45 upon which a relatively large gear 46 rotates, this gear being driven from a worm 47 on the shaft 44 and serving through suitable connections about to be described, to drive the master cam M. The driving connections between the gear and the master cam include a sleeve 48 rotating on a bearing 49 carried by the stud 45. This sleeve has a clutching engagement as indicated at 50 with the hub 51 of the gear 46. Rigidly fixed with respect to the sleeve 48 is the disk-like bottom 52 of the master cam M, the other component parts of which will be more fully hereinafter described.

Slide magazine

Fixedly secured upon the stud 45 immediately above disk 52 is a block 53 for supporting the slide magazine. A pin or screw 54 working through the block and into a notch 55 in the stud 45 secures the block in place. The slide magazine is in the form of a casting 56 (Figs. 5 and 6). This casting provides a pair of spaced vertical rectangular hollow columns 57 and 58 within which the slides 59 are accommodated. Three sides of the columns 57 and 58 are defined by the casting and the open rear sides of the columns are closed by a removable back plate 60 (Fig. 6) which is clamped against a web 61 of the casting by a thumb screw 62. The casting rests upon a bottom plate 63 which is cut away to accommodate for the sliding movement of the raised end 64a of the lower slidable pusher or shuttle plate 64, the latter being operable to remove the lowermost slide from the column 57 and advance it toward the column 58.

The tops of the columns 57, 58 are closed by a top plate 65, the latter having a central opening 66 therein covered by a transparent window 67. The casting affords a forwardly facing inclined support web 68 upon which is mounted a mirror 69, this mirror being disposed at a 45° angle with respect to the horizontal casting and being arranged directly under the opening 66 and directly opposite the lenses 30 which are associated with the light source. Thus light from the source is reflected on the mirror 69, thence upwardly through the window 66 at which one of the translucent slides 59 is exposed, thence through the relatively movable, reciprocally compensating lenses 70 and 71 which will be more fully hereinafter described and onto the mirror 38 which projects the image of the slide upon the screen 15.

Between the top plate 65 and the uppermost slide in the column 58 is disposed an upper pusher or shuttle plate 172 which as will be more fully hereinafter described, is slidable to a retracted position as a stack of slides in the column 58 is elevated and then thrust forward to push a new slide under the window 66.

Slidable in a groove in the underside of the plate 65 is a shutter 173, this shutter being adapted to intermittently black out images projected upon the screen. The shutter carries a pair of springs 174 (Fig. 5) which exert a downward pressure on the stack of slides in column 57 but which are yieldable, as a slide which has been under the window is thrust into the upper end of column 57 by shuttle 172.

In order to elevate the stack of slides in column 58 so that a new slide may be introduced under the bottom of the stack, there are provided a pair of lifting fingers 89, 89 (Fig. 8) movable through slots 90, 90 in the bottom plate 63 of the slide magazine. These fingers are carried by vertically extending arms 91 which pass through suitable openings or notches 92 in the top plate 65 of the magazine.

Means is provided for normally urging the stack lifting fingers 89 downwardly, such means including a post 93 rising from magazine top plate 65 and upon which is slidable a cross head 94 connecting the upper ends of arms 91. A coiled expansion spring 95 encircling the reduced post 93 and reacting against an adjustable tensioning nut 96 screwed onto the post, normally tends to depress cross head 94 and with it the rods 91 and the fingers 89 which they carry. When this cross head is in retracted position, the master cam cooperates with the springs 95 to effect a non-positive lift of the stack of slides in the column 58. For this purpose, a horizontally disposed bracket 97 is fixed to the bars 91 and at its outer end carries a roller 98 held against the master cam by spring 95.

False back plates 99 (Figs. 9 and 10) arranged in the respective columns 57 and 58 are fixed to studs 100 working through openings 101 in the rear walls of the columns. Coiled expansion springs 102 encircling the studs and reacting against the outside of the columns engage the heads of the studs to normally hold the false walls in the position illustrated in Fig. 10. To dislodge a complete stack of slides it is merely necessary to remove the rear plate 60 of the magazine and thrust the studs 100 forwardly against the action of their springs, thereby dislodging all of the slides from the columns.

In order to retain the stack of slides in the column 58 in elevated position after the entire stack has been lifted by fingers 89 and before a new slide has been pushed under the stack by the shuttle plate 64, the lowermost slides of the stacks are engaged by spring pressed plungers 103 working through the rear wall of the column 58. These plungers travel in sleeves 104 integral with the casting of which the columns form a part. The plunger actuating springs 105 are housed within these sleeves and tension on the springs is adjusted by plugs 106 screwed in the ends of the sleeves against the springs.

Lens mounting

The lenses 71 and 72 are supported in lens holders 71a, 72a, these holders being integral with horizontally disposed bracket arms 73 and 74 which are fixed upon sleeves 75, 76, vertically slidable upon the columns 35. Below the point of attachment of the bracket 73 to the sleeve 75 this sleeve carries another bracket 77 having an eye portion 78 vertically slidable on one of the small supplemental posts or columns 41 and the bracket 77 carries the roller 79 adapted to coact with one of the surfaces of the master cam M. Similarly, the sleeve 76 by which the lens 72 is indirectly carried, carries a bracket 80, this bracket being disposed below the bracket 74 and having a portion slidable on the post member 41 which forms part of the support for the motor platform 40. The bracket 80 carries a roller 81 for coaction with one of the surfaces of the master cam. The purpose of the brackets 77 and 80 and their rollers 79, 81, disposed about midway between posts 35, 41, is to prevent the upward thrust of the cam on the rollers from tending to jam the sleeves 75 and 76 on the columns 35 and to assist in translating an upward lift of the master cam into a direct upward sliding movement of the sleeves 75, 76 without substantial wear between the sleeves and the posts which they encircle.

The lenses 71 and 72 are of the general type illustrated in the copending application of White above referred to, being reciprocally compensating, that is to say, the two positive lenses move simultaneously in opposite directions toward or away from a fixed point between the lenses, at different rates of speed so that the image upon the screen is maintained continuously in focus while magnification or diminution of such image is occurring. The construction of the lens actuating mechanism herein illustrated is such that the image first appears on the screen at low magnification. Its magnification is then increased by moving the lenses toward each other until the image occupies substantially the entire area of the screen. At this point the image dwells at full magnification. Then while the lenses are moving apart to effect diminution of the image, the image is blacked out by the shutter and when the shutter is again opened, a new slide has been presented and a new image appears on the screen at low magnification. However, the timing of the shutter operation may obviously be varied in accordance with the particular requirements of the trade or the shutter may be entirely omitted if desired. Likewise the present master cam is so designed that the lenses are restrained against movement from their position of maximum magnification for a short period. In other words, a fully magnified image is permitted to dwell on the screen. Likewise the dwell feature is of value independently of any shutter arrangement and the particular time at which the dwell occurs may be readily controlled as well as the number of times that a dwell occurs, by a simple modification of the master cam structure, the details of which we shall now describe.

While one of the supplemental posts 41 is braced with respect to a rear post 36 through the motor supporting bracket 40, the other post 41 may be similarly braced by a brace bar 82 having an eye portion 83 which encircles the rear post 36 and having an apertured end secured to the top of the post 41 by a bolt 84.

The sleeves 75 and 76 are similarly mounted on their posts 35 and similar means is used for urging these lens carrying sleeves downwardly to maintain the rollers 79 and 81 in contact with operating surfaces of the master cam. Therefore the illustration in Fig. 14 of the manner in which the sleeve 76 is guided and spring urged downwardly, will also serve as sufficient illustration of the mounting of the sleeve 75.

As illustrated in Fig. 14 sleeve 76 is provided with two fixed internal collars or slide bearings 85 and 86. The post 35 has a collar 87 of diameter corresponding to the internal diameter of the sleeve 76 fixed thereon. A coiled expansion spring 88 concealed within the sleeve 76 reacts against the collar 87 and through the intermediacy of the collar 85 tends to thrust the sleeve downwardly on the post 35.

Mechanism operated by master cam

In addition to actuating the rollers 79 and 81 which control the motion of the reciprocally compensating lenses and actuating the roller 98 which controls the motion of the lifter fingers, the master cam likewise actuates the shutter 173 and the lower shuttle plate 64, and the latter through the intermediacy of a lever 107 actuates the upper shuttle plate 172. The lever 107 is pivoted intermediate its ends on a bracket 108 forming part of the magazine casting and has its respective ends disposed in slots 109 and 110 in the lower shuttle plate 64 and the upper shuttle plate 172 respectively. Thus the movement of the lower shuttle plate in one direction acts through the lever to cause movement of the upper shuttle plate in the opposite direction.

A bracket 111 fixed upon the magazine casting at the side opposite the bracket 108 affords pivotal mounting for a lever 112. The lower end of this lever carries a roller 113 for coaction with the master cam and the upper end of the lever extends through a slot 114 in the projecting end 115 of the shutter. A pin 116 screwed into the magazine casting passes through a relatively large clearance opening 117 in the lever 112 and a coiled expansion spring 118 reacting against the head 119 of the pin urges the lever 112 to the position shown in Fig. 5 of the drawings and thereby normally tends to maintain the film exposing opening 120 of the shutter in registry with the window 66.

The master cam

Fixed upon the disk 52 is a cylindrical member 121, the upper surface of which coacts with the roller 79. This cam surface designated at 79a is horizontal throughout the greater portion of the circumference of the cam and the remaining portion of the surface takes the form of two inclined ramps or working cam faces 79a' and 79a''. As the roller 79 descends the ramp 79a', the lower lens 71 will move downwardly and as it ascends the other ramp 79a'', this lens will move upwardly through the intermediacy of the bracket 77, sleeve 75, bracket 73 and lens carrier 71a.

Secured externally of the cylindrical cam element 121 is an arcuate cam 122, this cam resting upon a projecting ledge 123 afforded by the disk 52 and being secured as by screws 124 to the cam cylinder 121. The roller 81 which actuates the upper lens 72 normally rides on the ledge 123 except when it contacts with the cam surface 81a afforded by the upper edge of the cam member 122. Thereupon the roller is rapidly elevated and rapidly depressed, the respective inclination of the cam surface 81a and of the cam surface 79a' and 79a'' being indicative of the difference in the speed of movement of the two lenses as they are advanced toward or away from each other.

Secured against the inner face of the cam cylinder 121 near the top of the latter is a generally semi-cylindrical band member 125 having a flat upper surface 126. The ends of a strip of spring steel 98a are secured upon the flat surface 126 of the member 125 as by screws 127 and the intermediate portion of the spring 98a is elevated by a coiled expansion spring 128 reacting against the surface 126. Upwardly bowed spring cam member 98a coacts with the roller 98 to effect intermittent elevation of the lifting fingers 89.

For actuating the shutter, a strip of material 113a is mounted on the inner face of the member 125, strip 113a having inclined ends at 129 and the strip 113a coacting with the roller 113 to actuate the shutter 173.

Spindles 130 depending from the lower shuttle plate 64 at opposite sides of the block 53 carry ball bearing rollers 131 and forming part of the master cam is a special cam structure coacting with these rollers to shift the shuttle plate 64 back and forth and through the intermediacy of the lever 107, shift the upper shuttle plate 172 back and forth. Disposed within the cam element 121 is a relatively low cylindrical member 132, said member having a flange 133 snugly fitting within the cylinder 121 and resting on a raised rib 134 of the disk 52. A cam member 135 fixed with respect to the cylinder 132 and projecting inwardly from the edges of said cylinder is supplemented by a movable cam member 136, the latter being pivoted at 137 in the member 132 and having its larger or trailing end spring pressed outwardly to a slight extent by coiled expansion spring 138. Member 136 forms in effect a leading end and movable section of cam 135, the purpose of making the end 136 of this cam 135 yieldable, being to prevent jamming of the cam faces 131a and 131b with respect to the rollers 131, 131 which depend from the lower shuttle plate 64.

Operations controlled by cam

The top plan view of the cam (Fig. 13) shows the manner in which the roller 79 coacts with the cam faces 79a, 79a' and 79a''; the manner in which the roller 81 coacts with its corresponding cam faces 123 and 81a; the manner in which the roller 98 coacts with its cam face 98a; the manner in which the roller 113 coacts with its cam face 113a and the manner in which the cam faces 131a and 131b coact with rollers 131.

As the master cam continues to rotate counterclockwise from the position of Fig. 13 the leading pivoted end section 136 of cam 135 will engage the right hand roller 131 of Fig. 13 and through this roller, shift the shuttle plate 64 to the left. After another half-rotation the leading end 136 will engage the left hand roller 131 of Fig. 13 and shift this roller back to the position illustrated in Fig. 13, thereby thrusting the shuttle plate 64 to the right (Fig. 5).

Through the intermediacy of the lever 107, the upper shuttle plate 172 is of course shifted to the right (Fig. 5) as the lower shuttle plate moves to the left and vice versa.

As the roller 113 rolls up the ramp 129 the lower end of the lever 112 of Fig. 5 will be moved inwardly and due to the extremely high leverage afforded, the shutter will be snapped to a position where the opening 120 is out of registration with the opening 66. As the roller 113 travels down the ramp at the opposite end of the cam face 113a, spring 118 restores the shutter to its open position.

As the roller 98 rides onto the cam face 98a, the roller carrying bracket 97, the bars 91 and the lifting fingers 89 will all be elevated and as the roller 98 rides off of the cam surface 98a, the spring 95 will again depress the lifting fingers.

Relative advance of the lenses 71 and 72 toward each other is effected by the movement of the roller 79 up the incline 79a' at the same time that the roller 81 is travelling down the ramp 81a. During the time that rollers 79 and 81 are travelling on the cam surface 79a and the ledge 123 respectively, the lenses will be held in fixed position with the image at full magnification on the screen. As the roller 79 starts down the ramp 79a'' and the roller 81 starts up the ramp 81a, the lenses are moved away from each other to effect diminution of the image. During this movement of the rollers 79 and 81, the shutter actuating cam 113a has caused the shutter to screen the window 66 and during this movement also a new slide has been presented below the window 66.

*Operation of slide shifting mechanism*

The operation of the slide shifting mechanism is as follows:—

That portion 64a of the shuttle 64 which normally constitutes the bottom of the stack of slides in the column 57 projects above the bottom plate 63 to a distance approximating the thickness of one of the rectangular slide members. The thickness of the shuttle plate 172 also approximates the thickness of one of the slide members. With the parts in the position of Fig. 5, one slide 59a is in position under the window 66. There is a vacant space at the top of the stack of slides in column 57 and this stack of slides is being pressed downwardly by the springs 174 against the raised end 64a of the shuttle 64, such raised end thus constituting temporarily a bottom for the stack of slides in the column 57. The shuttle plate 172 meanwhile lies above the top of the stack of slides 59 in the column 58 and is in engagement with an edge of the slide 59a which has been pushed into position under the window 66 by the last movement to the left of the shuttle 72. The bottommost slide in the stack of column 58 rests upon the bottom plate 63 and a slide 59b also rests upon this bottom plate in position to be thrust to the right after the stack of slides in the column have been elevated to provide clearance for such movement.

Referring again to Fig. 13 it will be apparent that as the cam face 131b engages the right hand roller 131 and shifts the shuttle 64 fully to the left, the shuttle 172 will be shifted fully to the right (Fig. 5). As the pushers reach these extreme positions, the stack of slides in the column 57 will drop downwardly so that the lowermost slide of the stack occupies the position formerly occupied by the section 64a of the lower shuttle and the instant that the two pushers have reached their fully protracted position, the fingers 89 will engage and lift the stack of slides in the column 58 so that the topmost slide of this stack moves into the place formerly occupied by the pusher 172, it being borne in mind that the entire stack of column 58 is held in elevated position by spring plungers 103. The retraction of the slide members with the dropping down of the left hand stack of slides and the elevation of the right hand stack of slides occurs before the shutter is closed and without movement of slides 59a and 59b. During the period when the shutter is closed the cam 131b will shift the left hand roller 131 back to the position of Fig. 13, thereby shifting the two shuttle members back to the position illustrated in Fig. 5. As the lower shuttle moves back to the right, the slide which has dropped down in advance of the section 64a is thrust to the position theretofore occupied by slide 59b, slide 59b being forced into the vacant space under the stack of slides in column 58. Meanwhile as the shuttle 172 shifts to the left, it engages the slide which had just been elevated into position before it, forcing this slide into position under window 66 and thereby forcing the slide 59a over to the top of the stack of slides in column 57.

In other words, upon the retraction of each shuttle member a new slide is disposed in position to be actuated by it and through the intermediacy of these new slides, the slides 59a and 59b are shifted respectively onto the top of one stack and under the bottom of the other stack and their recent positions occupied by the slides which have just been advanced by direct thrust of the shuttles.

Throughout the specification we have referred to members 59 as slides, having used this term rather loosely to designate the assembled units illustrated in Figs. 11 and 11a. From the standpoint of the general operating mechanism it is merely necessary to provide a slide or a transparent or translucent picture or the like, so held that its carrier may be conveniently, mechanically shifted by the shuttle mechanism. In practice however we have designed a particular type of film carrying assemblage for the purpose which consists of a film holder element designated generally at H and a framing element designated generally at F, which securely, yet detachably, receives the film holder and which itself may be conveniently shifted about by the shuttle mechanism of the machine. The frame F consists of a substantially rectangular, solid metal frame member 150 having a pair of arcuate notches 151 in the ends thereof which extend downwardly from the top side of the frame and define arcuate ledges 152 near the bottom of the frame. The notched ends of the frame are also provided at their top side with inwardly extending ledges 153, these ledges being intersected by notches 151 aforementioned.

The small picture carrying film 154 is disposed between protective sheets of glass or other transparent material 155 and the laminated structure consisting of glass and film is held together by channel-like spring clips 156 slipped over the ends of the assembled laminations. The intermediate portion of each of these clips is cut away to define an outwardly extending spring tongue 157 projecting beyond the ends of the assemblage H.

To insert the member H into the member F, the former is pushed upwardly through the bottom of the frame so that the tongues 157 snap over the ledges 152 and so that the ledges 153 block upward movement of the film holder H. To release the parts from the assembled position shown in Fig. 11 a sharp pointed tool is introduced into either of the notches 151 and by forcing one of the spring tongues 157 inwardly the slide carrying holder H may be disengaged from the frame F.

In inserting the assemblage H from the bottom, a simple manual thrust on the assemblage of course forces the spring tongues 157 inwardly until they have cleared the edges 152, whereupon they spring outwardly and lock the assemblage H within the assemblage F, the latter assemblage preferably exceeding in all dimensions the corresponding dimensions of the contained assemblage, so that the frangible plates 155 as well as the flexible film between them are thoroughly protected from contact with the shuttle mechanism and from contact with adjacent slide assemblages.

The term "slide" as used therefore in the following claims is intended to embrace any unitary or multi-part assemblage which carries the picture or other device, the image of which is to be projected upon the screen.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described our invention, what we claim as new and desire to secure by Letters Patent is:—

1. A machine for projecting images upon a screen including a magazine adapted to receive object members, the images of which are to be projected, a light source, a reciprocally compensating lens system interposed between the light source and the screen and including lenses relatively movable to vary the size of a projected image while maintaining the image in focus, means for successively moving the objects into position for projection, a motor driven master cam cyclically actuating the lenses, said object shifting means being likewise actuated from said cam, a shutter mechanism interposed between the light source and screen, and means actuated by said cam for intermittently operating said shutter mechanism in synchronism with the movement of the lenses and objects.

2. An apparatus of the class described including a housing, one portion of the wall of which constitutes a projection screen, a light source within the housing, a projection system between the light source and the screen, a master cam, means including lenses movable to vary the size of an image on the screen while maintaining image in focus, shifting means for successively interposing a succession of slides between the light source and the lenses, a shutter movable to expose or conceal a slide in position for projection upon the screen, shutter actuating means, and lens actuating means, and operative connections between both of said last mentioned means and the master cam.

3. An apparatus of the class described including a housing, one portion of the wall of which constitutes a projection screen, a light source within the housing, a projection system between the light source and the screen, including lenses movable to vary the size of an image on the screen while maintaining the image in focus, shifting means for successively interposing a succession of slides between the light source and the lenses, a shutter movable to expose or conceal a slide in position for projection upon the screen, a master cam, means driven by said cam for moving the slides, the lenses and the shutter, said cam being continuously motor driven and including means to restrain the lenses against relative movement during certain periods and to effect relative movement of the lenses in relatively opposite directions during other periods.

4. An apparatus of the class described including a housing, one portion of the wall of which constitutes a projection screen, a light source within the housing, a projection system between the light source and the screen, including lenses movable to vary the size of an image on the screen while maintaining the image in focus, shifting means for successively interposing a succession of slides between the light source and the lenses, a shutter movable to expose or conceal a slide in position for projection upon the screen, a master cam, means driven by said cam for moving the slides, the lenses and the shutter, said cam being continuously driven and including means to restrain the lenses against relative movement during certain periods and to effect relative movement of the lenses in opposite direction during other periods, said shutter being operative to black out the image during movement of the lenses from a position of full magnification to a position of minimum magnification.

5. An apparatus of the class described including a housing, one portion of the wall of which constitutes a projection screen, means for supporting a plurality of slides within the housing, a light source within the housing, a projection system between the light source and the screen, including lenses for varying the size of an image on the screen while maintaining the image in focus, slide shifting means for successively interposing the slides between the light source and the lenses, a shutter movable to expose or conceal a slide in position for projection upon the screen, a master cam, means driven by said cam for moving the lenses, the slides, and the shutter, said cam being continuously driven and including means to restrain the lenses against relative movement during certain periods and to effect relative movement of the lenses in opposite direction during other periods, said slide shifting mechanism being operative to move the slides during periods when the shutter is closed.

6. An apparatus of the class described including a housing, one portion of the wall of which constitutes a projection screen, a light source within the housing, a projection system between the light source and the screen, including lenses movable to vary the size of an image on the screen while maintaining the image in focus, shifting means for successively interposing a succession of slides between the light source and the lenses, a shutter movable to expose or conceal a slide in position for projection upon the screen, a master cam, means driven by said cam for moving the slides, the lenses and the shutter, said cam including means to cause the image to dwell at maximum magnification on the screen.

7. An apparatus of the class described including a housing, one portion of the wall of which constitutes a projection screen, a light source within the housing, a projection system between the light source and the screen, including lenses movable to vary the size of an image on the screen while maintaining the image in focus, shifting means for successively interposing a succession of slides between the light source and the lenses, a shutter movable to expose or conceal a slide in position for projection upon the screen, a master cam, means driven by said cam for moving the slides, the lenses and the shutter, said cam including means to close the shutter during diminution of the image.

8. A machine for projecting images upon a screen including a magazine adapted to receive object members, the images of which are to be projected, a light source, a reciprocally compensating lens system interposed between the light source and the screen and including lenses relatively movable to vary the size of a projected image while maintaining the image in focus, a shutter movable to expose or conceal an object member in position for projection upon a screen, means for successively moving the objects into position for projection, and a motor driven master cam, means driven by said cam for moving the lenses and the objects, said cam being operable to only intermittently effect relative movement of the lenses, whereby the image at predetermined magnification intermittently dwells upon the screen, means actuated by said cam to close the shutter during movement of the lenses in one direction.

9. A machine for projecting images upon a screen including a magazine adapted to receive object members, the images of which are to be projected, a light source, a reciprocally compensating lens system interposed between the light source and the screen and including lenses relatively movable to vary the size of a projected image while maintaining the image in focus, a shutter movable to expose or conceal an object member in position for projection upon a screen, means for successively moving the objects into position for projection, and a motor driven master cam, means driven by said cam for moving the lenses and the objects, said cam being operable to only intermittently effect relative movement of the lenses, whereby the image at predetermined magnification intermittently dwells upon the screen, means actuated from said cam to shift the slides while the shutter is closed.

HENRY WHITE.
LOUIS W. G. FLYNT.